United States Patent [19]

Kerremans

[11] Patent Number: 5,210,394

[45] Date of Patent: May 11, 1993

[54] ELECTRIC CARPET SEALING IRON WITH DUAL ODOR AND SMOKE FILTRATION ARRANGEMENT

[76] Inventor: Frank Kerremans, 28 Bellerose Rd., Sound Beach, N.Y. 11789

[21] Appl. No.: 587,752

[22] Filed: Sep. 24, 1990

[51] Int. Cl.⁵ .................. H05B 3/00; D06F 75/00; D06F 75/36
[52] U.S. Cl. ........................ 219/245; 38/74; 38/75; 38/82; 38/89; 156/304.7; 156/579; 219/228; 219/230; 228/20
[58] Field of Search .............. 219/245–259, 219/228, 230; 38/74, 75, 89, 82; 156/304.7, 579; 228/20

[56] References Cited

U.S. PATENT DOCUMENTS

| | | | |
|---|---|---|---|
| 2,371,257 | 3/1945 | Oliving | 38/89 |
| 3,523,176 | 8/1970 | Hill | 219/22 SR |
| 3,706,146 | 12/1972 | Anderson | 38/75 |
| 3,721,026 | 3/1973 | McCallum | 38/75 |

FOREIGN PATENT DOCUMENTS

| | | | |
|---|---|---|---|
| 422554 | 5/1974 | U.S.S.R. | 219/230 |
| 835781 | 7/1981 | U.S.S.R. | 219/230 |

Primary Examiner—Anthony Bartis
Attorney, Agent, or Firm—Michael I. Kroll

[57] ABSTRACT

A smokeless carpet seaming iron for melting an adhesive on a carpet tape wherein non-contaminated air is discharged into the ambient from the seamer includes a housing which contains a vent outlet and an open bottom. First and second filters are disposed internally of said housing and are accessible externally of said housing for removal and replacement. An electrically heated sole plate is disposed internally of said housing for creating heat at said open bottom of said housing. And a motor and a fan with filters are disposed internally of said housing between the first and second filters for creating a suction within said housing drawing smoke and fumes created during the carpet seaming operation through the open bottom into the housing for filtration by the first and second filters before discharge through a vent head to the ambient atmosphere.

4 Claims, 2 Drawing Sheets

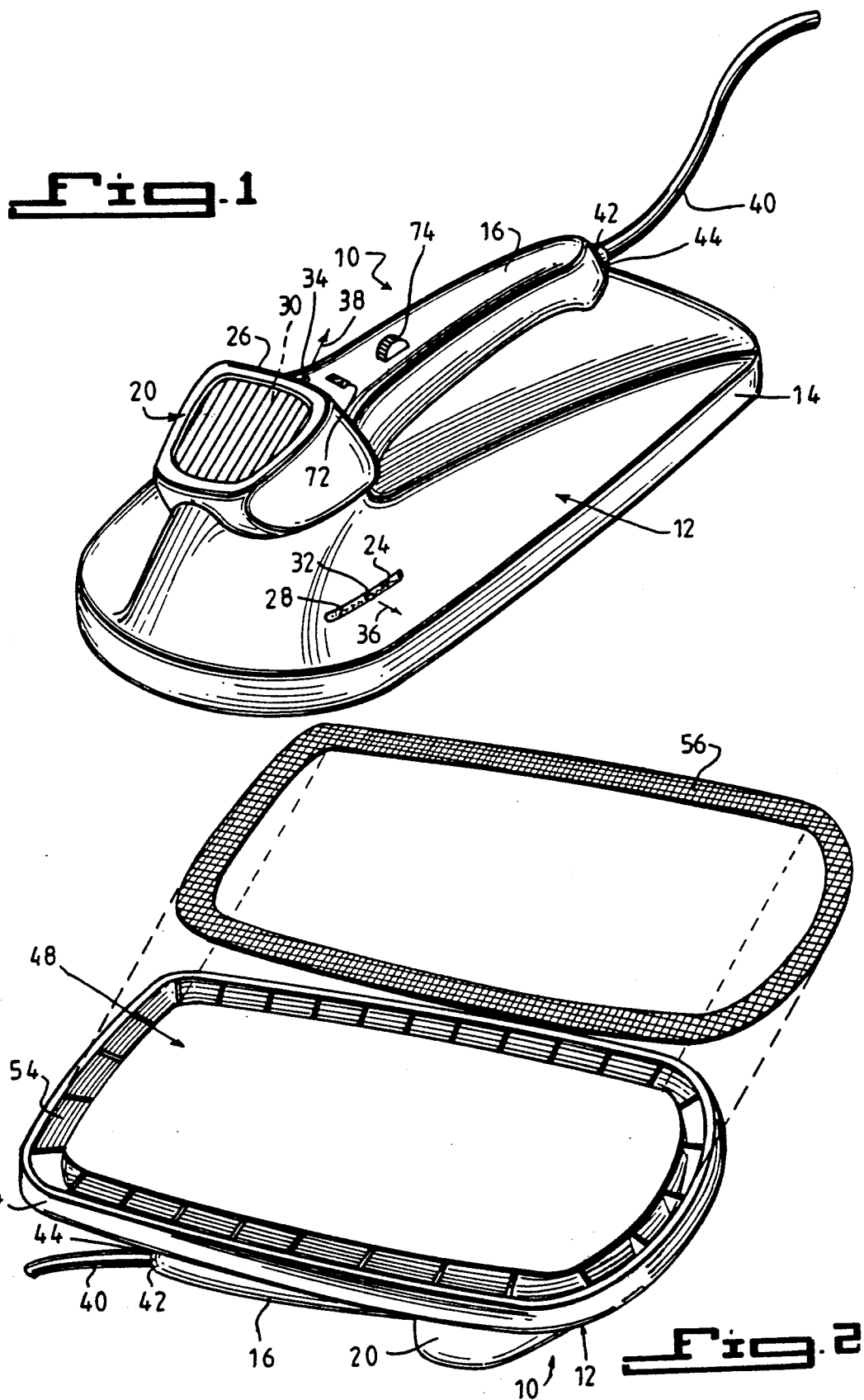

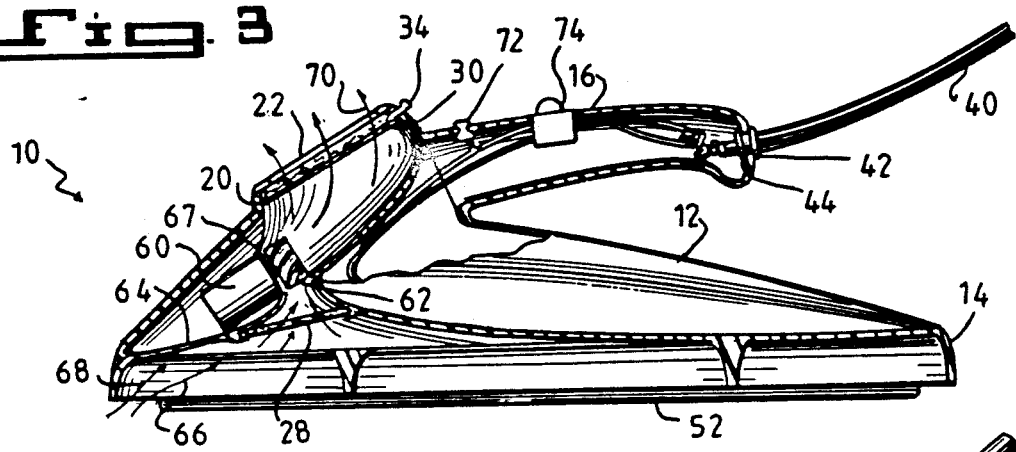
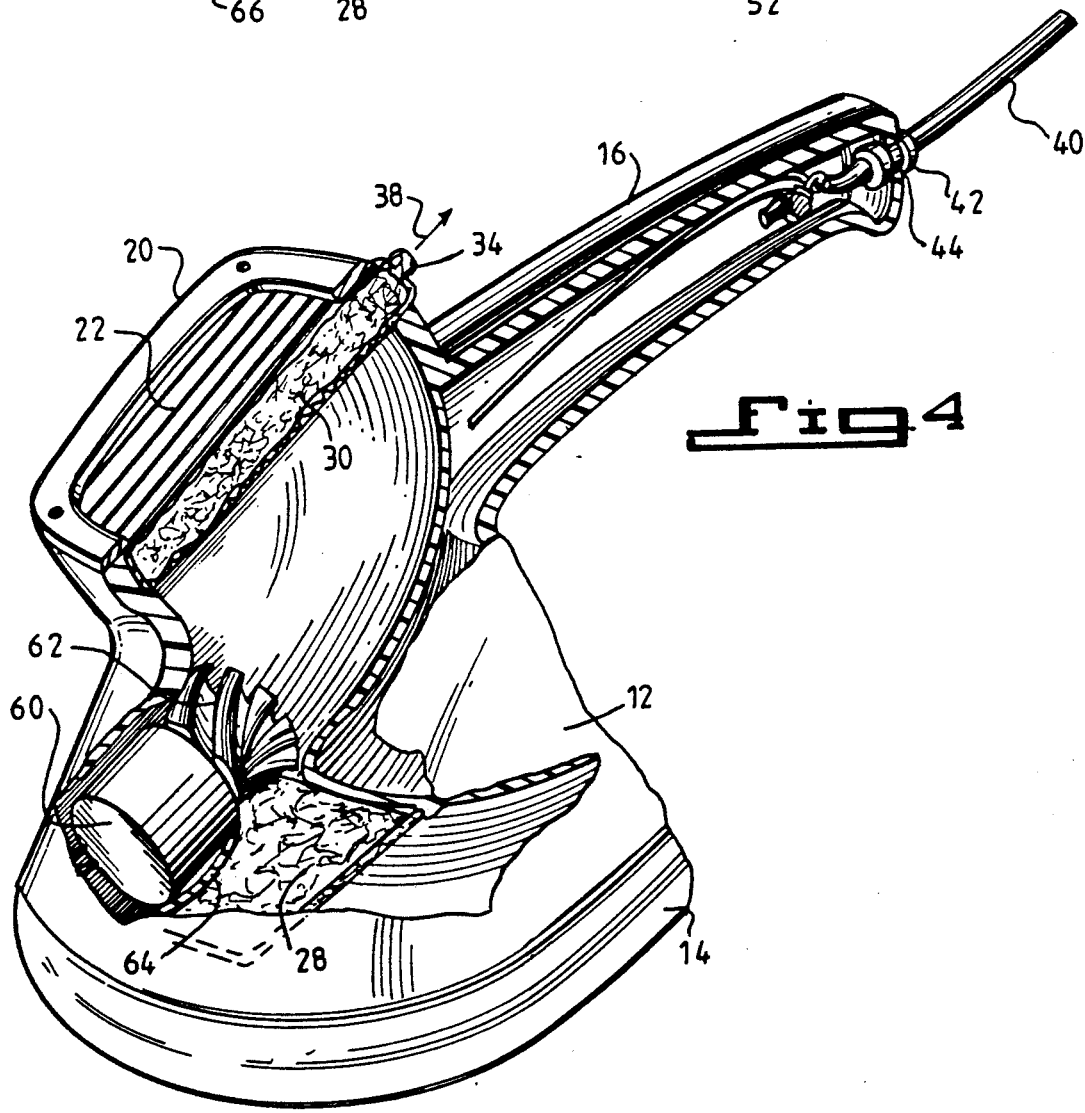

ELECTRIC CARPET SEALING IRON WITH DUAL ODOR AND SMOKE FILTRATION ARRANGEMENT

BACKGROUND OF THE INVENTION

1. Field of the Invention

The present invention relates to an iron.

More particularly, the present invention relates to a smokeless iron.

2. Description of the Prior Art

Numerous innovations for irons have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide an iron that avoids the disadvantages of the prior art.

More particularly, it is an object of the present invention to provide an iron that has a vacuum skirt located around the heating element; two filters filter the air for the removal of smoke and overall contamination that is released during a seaming of a carpet installation wherein the smokeless iron of the present invention uses a vacuum and a filter system for eliminating any fumes and any other hazardous smoke from entering into the ambient and lungs of the installers and anyone else in the house who is in close proximity while carpet seams are being seamed In keeping with these objects, and with others which will become apparent hereinafter, one feature of the present invention resides, briefly stated, in a smokeless carpet seamer for melting an adhesive on a carpet tape wherein non-contaminated air is discharged into the ambient from the seamer, and includes a housing containing an open bottom, filters disposed internally of the housing and being accessible externally of the housing, means disposed internally of the housing for creating heat at the open bottom of the housing, and means disposed internally of the housing for creating a suction within the housing.

When the smokeless iron is designed in accordance with the present invention, a vacuum and a filter system is provided to eliminate any fumes and any other hazardous smoke from entering into the ambient and lungs of the installers and anyone else in the area who is in close proximity while carpet seams are being spliced.

In accordance with another feature of the present invention, the housing is chosen from the group consisting of plastic, metal, and composite.

Another feature of the present invention is that the housing contains a first substantially rectangular slot and a second substantially rectangular slot into which the filters are disposed.

Yet another feature of the present invention is that it further comprises a handle disposed on the housing, the handle and the housing being one homogeneous part.

Still another feature of the present invention is that it further comprises a vent head with integral vents, the handle, the vent head, and the housing being one homogeneous part.

Yet still another feature of the present invention is that it further comprises a vacuum skirt disposed around the open bottom of the housing and acting as a wall, the handle, the vent head, the vacuum skirt, and the housing being one homogeneous part.

Still yet another feature of the present invention is that the filters include a motor filter and a vent filter, the motor filter being removably disposed in the first substantially rectangular slot and the vent filter being removably disposed in the second substantially rectangular slot.

Another feature of the present invention is that the motor filter and the vent filter each contain a finger grip for easy removal of the filters.

Yet another feature of the present invention is that the heating means include a heating element whose configuration is analogous to that of a flat plate, the heating element being disposed at the open bottom of the housing, the heating element being surrounded by vacuum ports, the vacuum ports being prevented against injecting foreign matter by being covered with a screen.

Still another feature of the present invention is that the suction means include a motor and a fan, the fan being rotatably connected to the motor.

Yet still another feature of the present invention is that the heating element is guided along the carpet tape so that the adhesive on the carpet tape begins and continues to melt, and the fan turns by the motor and creates a suction at the vacuum ports and the contaminated air is isolated from the ambient by the wall of the vacuum skirt and the suction draws the contaminated air through the motor filter for the first filtering process and then through the vent filter for the second filtering process and into the ambient as odorless non-toxic air.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a top perspective view of the smokeless iron of the present invention;

FIG. 2 is a bottom perspective view of the smokeless iron of the present invention, with the screen separated and showing the heating element and the vacuum ports;

FIG. 3 is a side view in cross-section of the smokeless iron of the present invention, showing the interior parts; and FIG. 4 is a top perspective view in partial cross-cross-section of the smokeless iron of the present invention, showing the interior parts.

DETAILED DESCRIPTION OF THE PREFERRED EMBODIMENT

Referring now to FIGS. 1 and 2, for the external configuration of the smokeless iron which is shown generally at 10, and includes a substantially one piece homogeneous housing 12. The housing 12 can be made of plastic, metal, composites, or the like.

The housing 12 is formed with a vacuum skirt 14, a handle 16, and a vent head 20. The vent head 20 contains integral vents 22. The housing 12 is provided with slots 24 and 26 for gaining access to the motor filter 28 and the vent filter 30. Slots 24 and 26, in the housing 12, allow the filters 28 and 30 to be readily removed and changed without having to disassemble any part of the smokeless iron 10.

To even further simplify the changing of the filters 28 and 30, each contains an integral finger grip 32 and 34, respectively. The finger grips 32 and 34, respectively, are grabbed and pulled in the direction of the arrows 36 and 38, respectively, so that the filters 28 and 30 come out easily.

Power for the smokeless iron 10 is provided through the electrical cord 40 which enters the handle 16. The electrical cord 40 is protected by a grommet 42 strain-relief disposed at the entrance 44 to the handle 16.

The smokeless iron 10 is shown up-side-down in FIG. 2 so that the details of the bottom 46 can be observed. The vacuum skirt 14 encircles the heating section 48 and forms a wall 50. When the smokeless iron 10 is in operation, the wall 50 prevents any fumes from escaping through the bottom. The heating section 48 includes a electrically heated sole plate 52, vacuum ports 54, and a screen 56.

The sole plate 52 is a substantially flat plate provided with an electric heater. When the sole plate 52 is hot, and the smokeless iron 10 is applied to the carpet tape (not shown), the adhesive (not shown) on the carpet tape is activated to hold the splice joint (not shown) of the carpet seam together.

However, during the splicing process in which the adhesive melts, fumes are produced from the carpet tape that have offensive odors and could be toxic, to say the least. In order to prevent these fumes from escaping into the ambient, vacuum ports 54 are provided around the entire sole plate 52 so that as the fumes are produced, the wall 50 of the vacuum skirt 14 contain the fumes while the vacuum ports 54 simultaneously suction the fumes into the housing 12 of the smokeless iron 10. A screen 56 is removably mounted to the bottom 46. The screen 56 covers the vacuum ports 54 so that the vacuum ports 54 are protected against jamming caused by foreign matter (not shown).

Referring now to FIGS. 3 and 4, for the internal configuration of the smokeless iron 10 which includes the motor filter 28, a motor 60, a fan 62, and the vent filter 30.

The arrows 66 indicate the air circulation path of the smokeless iron 10. The air circulation path includes two portions. The portion 68, which is below the motor filter 28 and contains contaminated air while the portion 70, which is above the motor filter 28 contains air that is filtered twice, that is, by the motor filter 28 and the vent filter 30, as it enters the ambient. This assures that the air 70 entering the ambient is substantially odorless, non-toxic, and non-contaminated. Neon lamp 72 is provided to indicate that the iron is on and heat selector 74 permits various settings.

As shown, the motor 60 is mounted to an inner structure 64, and the fan 62 is mounted to the armature shaft 67 of the motor 60.

In operation of a prior art carpet seaming iron, as the iron is heated up and guided along the carpet tape, the sole plate 52 begins to melt the adhesive on the carpet tape. As the prior art iron is guided along the carpet tape, the adhesive continues to melt. As the adhesive melts, it gives off toxic fumes and a very unpleasant odor.

However, with the smokeless iron 10 of the present invention this does not occur. As the fan 62 is turned by the motor 60, a suction is created in the air path at the vacuum ports 54. The contaminated air 68 is isolated from the ambient by the wall defining the vacuum skirt 14. The suction draws the contaminated air 68 through the motor filter 28 for the first filtering process. The air (still containing some degree of contamination) is then drawn through the vent filter 30, for the second filtering process, and into the ambient for imparting, odorless, non-toxic air.

It will be understood that each of the elements described above, or two or more together, may also find a useful application in other types of constructions differing from the type described above.

While the invention has been illustrated and described as embodied in a smokeless iron, it is not intended to be limited to the details shown, since it will be understood that various omissions, modifications, substitutions and changes in the forms and details of the device illustrated and in its operation ca be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A smokeless carpet seamer for melting an adhesive on a carpet tape wherein non-contaminated air is discharged into the ambient from the seamer, comprising:
    a) a hollow housing having an open bottom and a vent head with integral vents for discharge of air into the ambient atmosphere, said housing being made from material chosen from the group consisting of plastic, metal, and composite, said housing containing a first substantially rectangular slot and a second substantially rectangular slot through which filters are insertable into said removable from said housing;
    b) a handle on said housing for manipulation of said housing
    c) removable filters disposed internally of said housing and being accessible externally of said housing for removal;
    d) means disposed internally of said housing for creating heat at said open bottom of said housing for heating a carpet tape disposed below said open bottom;
    e) means disposed internally of said housing for creating a suction within said housing for drawing fumes and smoke into said housing through said open bottom, said filters and said suction creating means being so arranged to filter the drawn in air to eliminate smoke particles and fumes therefrom, said suction creating means include a motor and a fan, said fan being rotatably connected to said motor, said filters include a motor filter and a vent filter, said motor filter being removably disposed in said first substantially rectangular slot and said vent filter being removably disposed in said second substantially rectangular slot, said motor filter being positioned in said housing between said open bottom thereof and said motor and said fan of said suction creating means, and said vent filter being located in said head between said motor and fan and said vents;

f) said housing including a vacuum skirt disposed around the entire periphery of said open bottom of said housing and acting as a wall; and g) said handle, said vent head, said vacuum skirt and said housing being one homogeneous part.

2. A seamer as defined in claim 1, wherein said motor filter and said vent filter each contain a finger grip for easy removal of said filters.

3. A seamer as defined in claim 2, wherein said heating means comprises an electrically heated sole plate having a configuration is analogous to that of a flat plate, said sole plate being disposed at said open bottom of said housing, said sole plate being surrounded by vacuum ports between the periphery of sole plate and said vacuum skirt through which said suction creating means draws fumes and smoke into said housing for filtration, said vacuum ports being prevented against injecting foreign matter into said housing by being covered with a screen.

4. A seamer as defined in claim 3, wherein as said heating element is guided along the carpet tape so that the adhesive on the carpet tape begins and continues to melt, said fan is turned by said motor to create a suction at said vacuum ports and the contaminated air is isolated from the ambient by said wall of said vacuum skirt, said suction means draws the contaminated air through said motor filter for a first filtering process and the through said vent filter for a second filtering process for discharge through said vents into the ambient as odorless non-toxic air.

* * * * *